A. L. PUTNAM.
VEHICLE WHEEL.
APPLICATION FILED JUNE 27, 1919.
1,420,862.
Patented June 27, 1922.
2 SHEETS—SHEET 1.
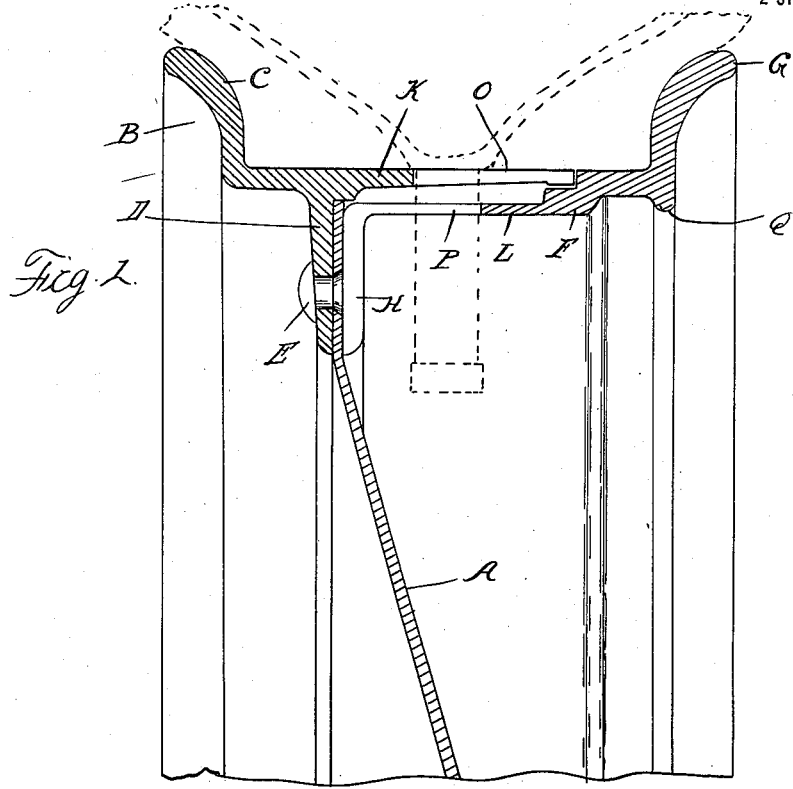
Fig. 1.
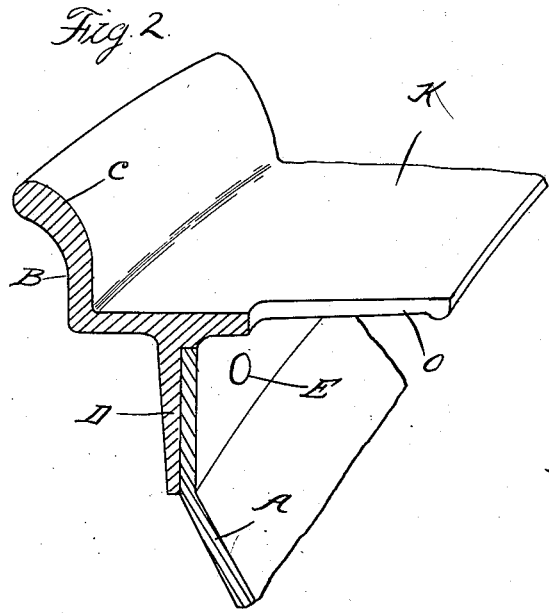
Fig. 2.
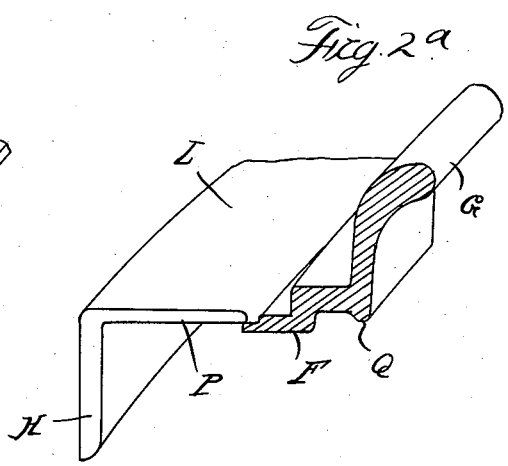
Fig. 2ª.
Inventor
Alden L. Putnam
By Hulbert & Whittemore
Attorneys

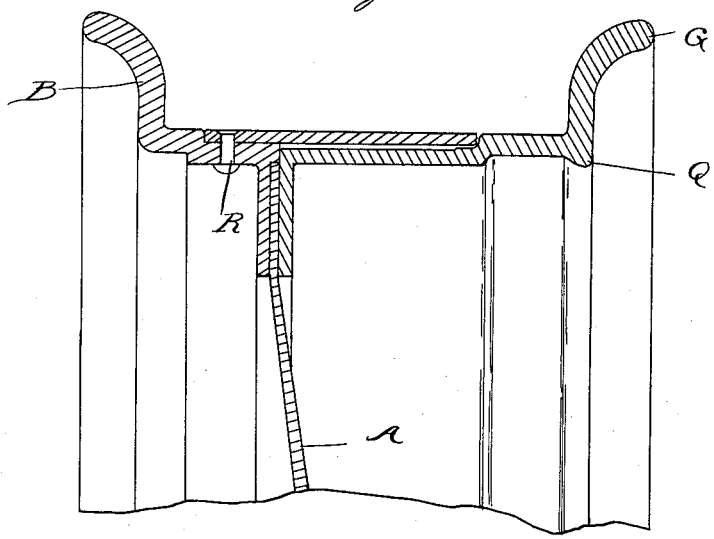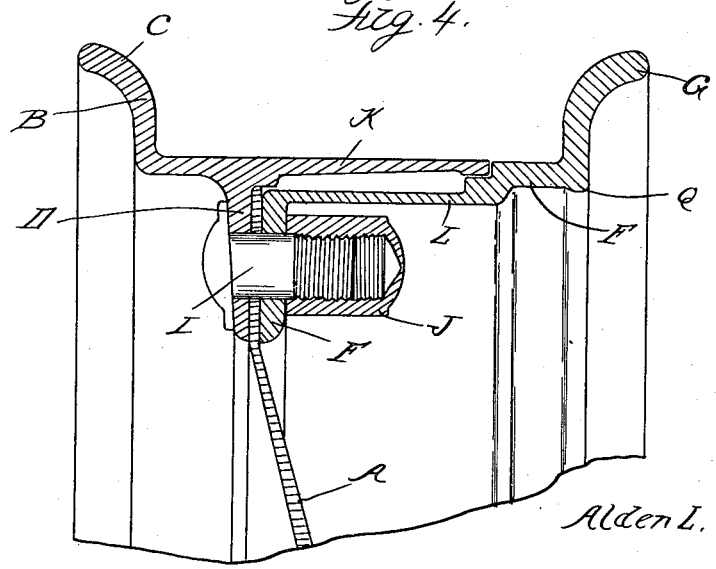

UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

VEHICLE WHEEL.

1,420,862. Specification of Letters Patent. Patented June 27, 1922.

Application filed June 27, 1919. Serial No. 307,139.

*To all whom it may concern:*

Be it known that I, ALDEN L. PUTNAM, a citizen of the United States of America, residing at Detroit, in the county of Wayne and State of Michigan, have invented certain new and useful Improvements in Vehicle Wheels, of which the following is a specification, reference being had therein to the accompanying drawings.

The invention relates to vehicle wheels of that type in which the tire-holding rim is formed in separable sections secured to the body portion of the wheel, such, for instance, as a dished disk, and at one side of the central plane of the wheel. It is the object of the invention to facilitate the mounting of the tire and also the inflation of the same when mounted. In the present state of the art with wheels of the type above referred to, it is usual to mount the dished disk upon the wheel hub with the peripheral portion extending outward. This brings the central plane of the wheel inside of the point of attachment of the larger rim section so that the tire inflation tube is behind the disk where it is difficult of access. If, on the other hand, the disk is arranged oppositely upon the hub, then the smaller or removable section of the rim is on the inner side of the wheel which would prevent attachment or detachment of the tire. With my improved construction the inflation tube and the detachable section of the rim are on the same side of the wheel and the construction is such as to permit both access to the tube and easy engagement of the tire.

In the drawings:

Figure 1 is a cross-section through a portion of the vehicle wheel to which my improvements are applied;

Figures 2 and 2ª are sectional perspective views showing the removable section of the rim detached from the stationary section thereof;

Figure 3 is a cross-section through the rim showing a modified construction;

Figure 4 is a view similar to Figure 1 taken on a different plane.

A is the dished disk, which is adapted to be secured upon the hub of the wheel (not shown). B is the rim section, which is permanently attached to the disk, being provided with a tire engaging flange C and the inwardly extending flange D, the latter being attached to the disk by suitable means, such as the rivets E. F is the removable section of the rim which is provided with the tire-engaging flange G and the inwardly-extending flange H detachably secured to the disk and to the flange D by bolts I and nuts J.

To permit of arranging the tire inflation tube on the outer side of the disk, the section B is arranged upon that side of the central plane of the wheel which is nearest to the periphery of the disk. Inasmuch, however, as the distance between the flanges C and D is only a small part of the width of the tire, a portion of the rim extending between said flanges will not be sufficient for holding the tire before the section F is attached. On the other hand, if the tire is placed on the detachable section F first, then both the weight of the tire and the detachable section must be lifted to engage the same with the permanent section of the rim. I have avoided both objections by providing the rim section B with an extension of the cylindrical portion thereof beyond the plane of the flange D, this being of sufficient length to form a mounting for the tire. The extension K overlaps the cylindrical portion L of the section F with sufficient clearance therebetween to avoid combining when said sections are engaged with each other. There is, however, a ledge M upon the portion L which forms a comparatively close fit with a portion N at the outer end of the extension K, so that the latter will be supported by this ledge.

The extension K projects beyond the central plane of the wheel on one side thereof, while the portion L of the section F projects beyond said central plane on the opposite side thereof and therefore to facilitate the placing of the tire upon the rim without interference with the inflation tube, the two rim sections are slotted for the passage of said inflation tube, as indicated at O and P. Thus, when the tire is first placed upon the rim section B, it may be engaged with the cylindrical portion thereof without the necessity of tilting for the insertion of the tire inflation tube endwise through an aperture in the rim. On the contrary, said inflation tube will enter through the open end of the slot O and assume its normal position. In the same manner when the section F is engaged with the section B, the open slot P will register with the inflation tube and will permit of engaging the two rim sections without tilting either one.

It is usual in the manufacture of tire-engaging rims to form the same from sheet metal having a uniform gauge, so that the clearance of the tire-engaging flanges and the clearance of the cylindrical seating portion is the same. This is not an advantageous disposition of the metal for the stresses to which different portions are subjected vary both in degree and direction; for instance, the tire-engaging flange is subjected to both an outward lateral pressure and a radially inward pressure, while the cylindrical portion of the rim is chiefly subjected to tension stresses. Consequently, the gauge of the cylindrical portion may be much lighter than the gauge of the flange portion and still be abundantly strong to carry the stresses to which it is subjected.

With my improved construction the rim sections are preferably mill-rolled and the metal is so disposed as to most advantageously carry the stresses. Thus, as shown, the flanges C and G are of considerably greater thickness in their outer portions than at the point of merging into the cylindrical flange, while the overlapping cylindrical portions K and L are made of light gauge. Again, the flange G at the point that it merges into the cylindrical flange is reinforced by a radially inwardly extending portion Q which gives an added section to resist compression stresses which are centered at this point. Thus, the rim of varying section, as described, is both stronger and lighter than a rim formed of uniform gauge.

In the modified construction shown in Figure 3, the tire supporting portion of the attached rim section, which telescopes with the detachable rim section, is formed of a separate cylindrical member riveted or otherwise secured to the section, as indicated at R. This simplifies the operation of rolling the section and performs the same function as in the construction previously described.

What I claim as my invention is:

1. A vehicle wheel comprising a disk body, a rim having a section attached to said disk for directly receiving the tire and fashioned to accommodate a radial tire inflation tube arranged on the side of the disk from which the tire is engaged, and a clamping section engageable with the disk on the same side as the tire inflation tube.

2. A vehicle wheel comprising a disk body having its peripheral portion at one side of the central plane of the wheel, a tire engaging rim having a section directly attached to said disk forming a seat for receiving the tire, and a clamping section telescopically engaging within said tire seating portion and detachably secured to said disk.

3. A vehicle wheel, comprising a disk body having its peripheral portion at one side of the central plane of the wheel, a tire-engaging rim having a section directly attached to said disk and extending beyond the same to form a seat for receiving the tire, and a clamping section having a portion telescopically engaging within said seat portion and detachably secured to said disk.

4. A vehicle wheel, comprising a disk body having its peripheral portion at one side of the central plane of the wheel, and a tire-engaging rim comprising two sections, one of said sections being directly attached to said disk and provided with a cylindrical seat for the tire extending to the opposite side of the central plane of the tire and the other of said sections having a portion telescoping within said seat portion and detachably secured to said disk.

5. A vehicle wheel, comprising a disk body having its peripheral portion at one side of the central plane of the wheel, a tire-engaging rim formed in two sections oppositely secured to the peripheral portion of said disk, the section secured to the disk at its side remote from the central plane of the wheel being provided with a seat portion for receiving the tire which extends to the opposite side of the central plane of the wheel.

6. A vehicle wheel, comprising a disk body having its peripheral portion at one side of the central plane of the wheel, and a rim formed in two sections secured to the peripheral portion of said disk, said sections having telescopically engaged portions extending upon opposite sides of the central plane of the wheel, the outer section forming a seat for receiving the tire, and said sections being provided with registering slots for the entrance of the tire inflation tube.

7. A vehicle wheel, comprising a disk body having its peripheral portion at one side of the central plane of the wheel, a tire engaging rim having a section directly secured to said disk and provided with a cylindrical seat for receiving the tire extending beyond said disk and to the opposite side of the central plane of the wheel, and the other of said sections having a portion telescoping within the cylindrical portion of said first mentioned section and detachably engaging said disk.

8. In a vehicle wheel, a tire engaging rim comprising two sections having outwardly-extending flanges for engaging opposite sides of the tire case, and cylindrical portions telescopically engaging each other to extend upon opposite sides of the central plane of the wheel, the outer of said cylindrical portions forming a tire-engaging seat, and inwardly extending flanges for clamping said sections to each other offset from the central plane of the wheel.

9. In a vehicle wheel, a tire engaging rim comprising a section having an outwardly-extending flange for engaging one side of the tire, a cylindrical portion forming a seat for receiving the tire, and an inwardly extending flange intermediate the edges of said cylindrical portion, and a section having an outwardly-extending flange for the opposite side of the tire, a cylindrical portion telescopically engaged within the cylindrical portion of the first-mentioned section, and an inwardly extending flange for clamping engagement with the inwardly extending flange of the other section.

10. In a vehicle wheel, the combination with a disk body member, of a pair of telescopically engaged rim sections secured to said body member at opposite sides thereof.

11. In a vehicle wheel, the combination with a disk body member, of a pair of telescopically engaged rim sections secured to said body member at opposite sides thereof and formed with registering openings to accommodate a tire inflation tube.

In testimony whereof I affix my signature.

ALDEN L. PUTNAM.